A. BAILEY.
SHOCK ABSORBER.
APPLICATION FILED JUNE 5, 1914.
1,155,700.
Patented Oct. 5, 1915.
2 SHEETS—SHEET 2.
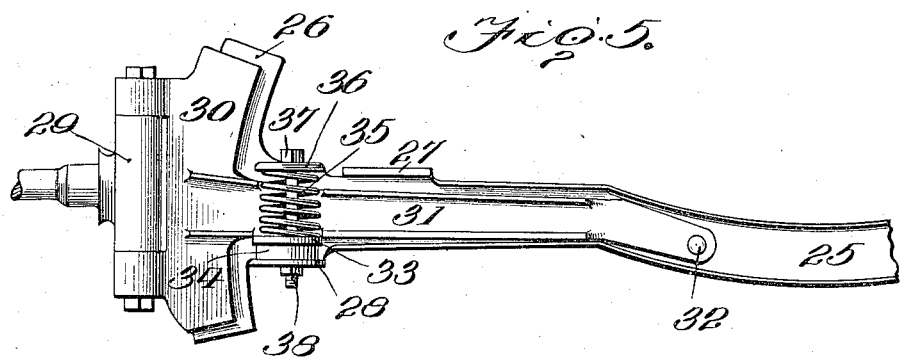
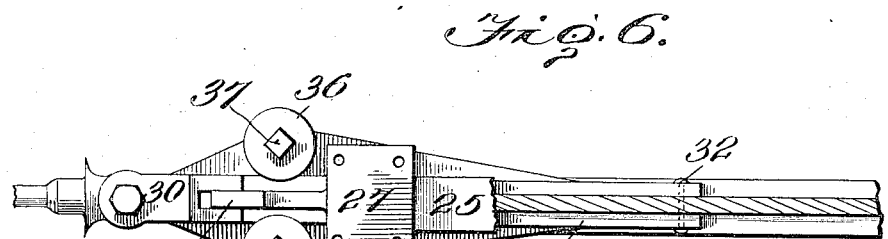
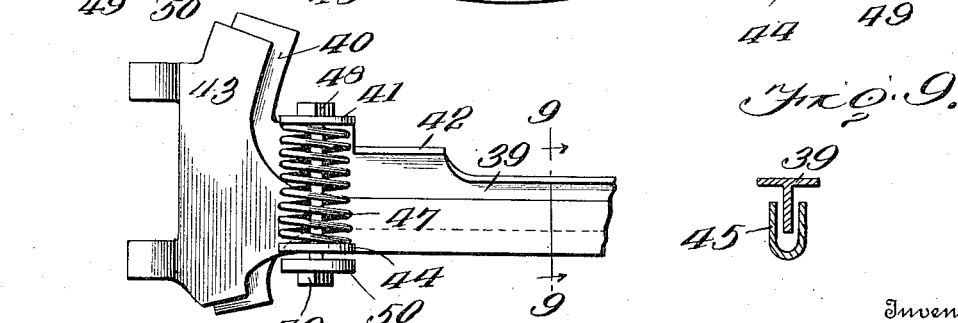

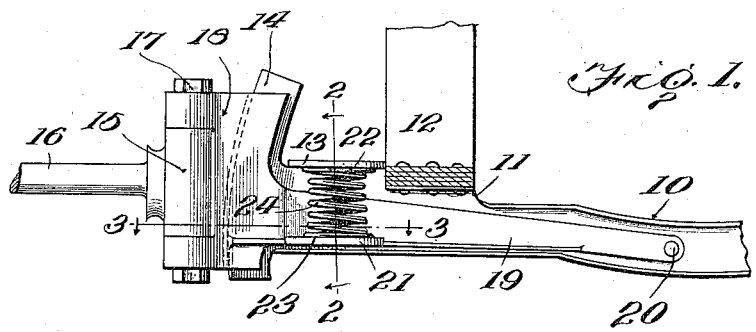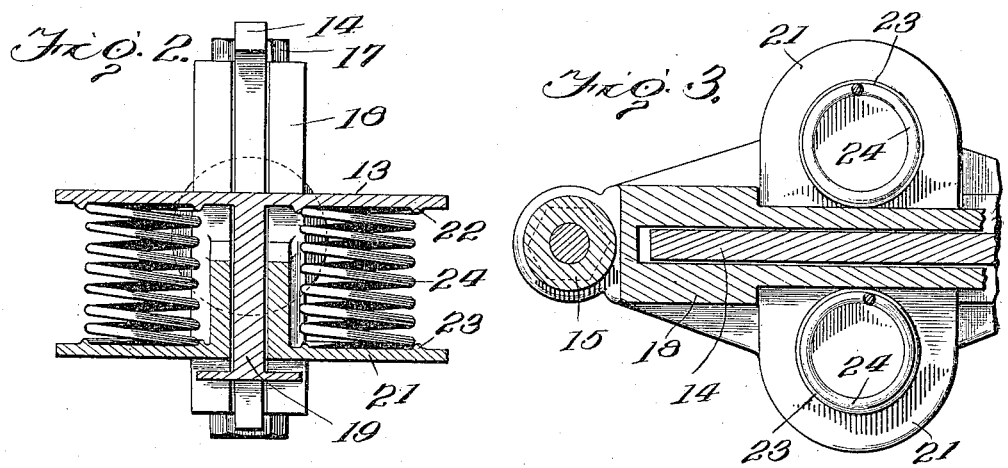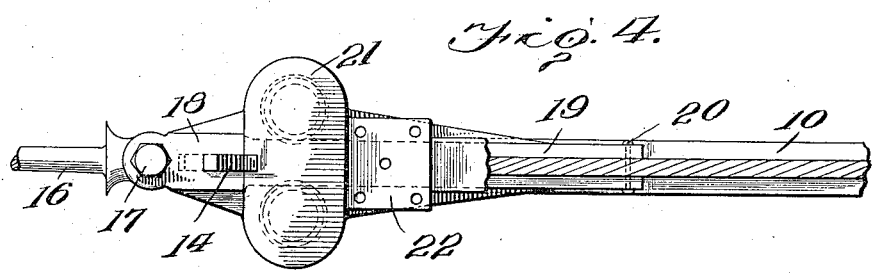

UNITED STATES PATENT OFFICE.

AUBURN BAILEY, OF OAKLAND, CALIFORNIA.

SHOCK-ABSORBER.

1,155,700.  Specification of Letters Patent.  Patented Oct. 5, 1915.

Application filed June 5, 1914. Serial No. 843,280.

*To all whom it may concern:*

Be it known that I, AUBURN BAILEY, citizen of the United States, residing at Oakland, in the county of Alameda and State of California, have invented certain new and useful Improvements in Shock-Absorbers, of which the following is a specification.

My invention relates to new and useful improvements in shock absorbers and particularly shock absorbers for the forward axles of self-propelled vehicles, the primary object of my invention being the provision of a three-part forward axle for automobiles including a central portion supporting the body of the vehicle and wheel carrying portions pivotally connected to the central portion and yieldably held in alinement therewith.

A further object of my invention is to provide cushioning means between the central and end portions of the axle to permit limited movement of the central portion with respect to the end portions, thereby preventing undue vibration of the vehicle body, due to passage of the forward wheels of the vehicle over uneven surfaces.

A still further object of my invention consists in the provision of means for limiting the relative movement of the end portions of the axle with respect to the central portion and for adjusting the cushioning means to vary resistance which it shall offer to such movement.

With these and other objects in view, my invention will be more fully described, illustrated in the accompanying drawings, and then specifically pointed out in the claims which are attached to and form a part of this application.

In the drawings:—Figure 1 is a fragmentary front elevational view of my invention, one of the semi-elliptic springs commonly employed, being shown in section; Fig. 2 is a vertical sectional view taken on the line 2—2 of Fig. 1; Fig. 3 is a sectional view taken on the line 3—3 of Fig. 1; Fig. 4 is a top plan view of the structure shown in Fig. 1; Fig. 5 is a view similar to Fig. 1, illustrating a somewhat modified form of my invention; Fig. 6 is a top plan view, partially in section, of the form of shock absorber shown in Fig. 5; Fig. 7 is a front elevational view of an entire front axle, illustrating a further modification of my invention; Fig. 8 is a fragmentary enlarged view of one terminal of the axle, showing the connection between the axle body and the steering knuckle portion of the axle; Fig. 9 is a transverse sectional view taken on the line 9—9 of Fig. 8, looking in the direction of the arrows.

Corresponding and like parts are referred to in the following description and indicated in all the views of the drawings by the same reference characters.

In constructing a shock absorbing axle in accordance with my invention, the central or axle member proper, indicated as a whole by the numeral 10, is substantially identical in construction, save at its ends, to the axles now in use, being preferably I-shaped in transverse section and enlarged or thickened adjacent its outer ends to increase its strength, being provided with laterally directed shoulders 11 forming seats for the semi-elliptic body supporting springs 12 which extend longitudinally of the vehicle in the usual manner. Immediately beyond these seats, I provide additional laterally directed shoulders 13, substantially semi-circular in shape to form seats for the cushioning springs of my shock absorber, as will be later explained. These shoulders are located at the upper edge of the axle and immediately beyond them the axle, at its free end, terminates in a vertically disposed guide blade 14 which is arcuate as best shown in Fig. 1.

The end portions of my improved front axle are identical in construction and a disclosure and explanation of one will suffice for both. Each end portion includes primarily, a steering knuckle 15 having the usual wheel supporting spindle 16, this steering knuckle being pivotally supported by the knuckle pin 17 between the spaced ears of the steering knuckle yoke 18. The body portion of the yoke is bifurcated to receive the arcuate head or blade 14 of the adjacent axle end and such body portion, at either side of the axle, is extended to provide lever attaching arms 19 which are pivoted at their free ends to opposite sides of the main axle 10 by a pivot pin or other suitable device 20. It should be noted at this point, that this pivot pin forms the center of curvature for the arcuate blade 14 and that the slotting of the body portion of the yoke 18 is such as to permit swinging movement of the yoke with respect to the central axle member 10. Inasmuch as the lever arms 19 of the yoke extend between the upper and lower flanges of the I-shaped axle forming beam, it will be readily understood that such swinging movement of the yoke with respect to the axle member 10 is limited by the engagement of the arms against one or the other of these flanges.

The yoke arms 19 adjacent the body of the yoke, that is, immediately below the seat forming shoulders 13 of the axle member 10, are provided, at their lower edges, with laterally directed shoulders 21 corresponding in shape and size to the shoulders 13 of the axle member 10. The lower faces of the shoulders 13 and upper faces of the shoulders 21 are provided with annular retaining ribs 22 and 23, respectively, and relatively stiff helical compression springs 24 are interposed between the shoulders 13 and 21, one at either side of the axle, seating at their upper and lower ends within the ribs 22 and 23 and being thereby held against lateral displacement. These springs should be of such strength and stiffness as to normally support a vehicle body in the manner shown in Fig. 1, when the load is normal. Under these conditions, it will be clear that if the forward wheels of the vehicle pass over any irregularities in the road, the jar which would otherwise be transmitted to the vehicle body, will be taken up and absorbed, to a great extent, by the cushioning springs 24. The extent to which the pivoted axle members may swing upwardly with respect to the main axle member 10 is, however, limited by the seating of the lever arms 19 of the pivoted axle members between the upper and lower flanges of the main axle member 10 and any excessive movement of parts is therefore prevented.

In Figs. 5 and 6 I have illustrated a somewhat modified form of construction in which the main or central axle member 25 is provided at its ends with the arcuate heads or blades 26 and adjacent these blades with the semi-elliptic spring receiving shoulders or seats 27, corresponding to the blades 14 and seats 11 of the form previously described. Instead, however, of being provided at their upper edges, adjacent the seats 27, with seats corresponding to the seats 13 of the first form, they are provided at their lower edges with laterally directed shoulders forming seats 28. Preferably, in this form also, the arcuate blades or heads 26 extend somewhat farther below the level of the axle member 25 than in the form previously described. The steering knuckle 29 in this form is identical in construction with the steering knuckle 15 and is similarly mounted in a yoke 30, bifurcated to receive the arcuate blade 26 and extended to provide the attaching lever arms 31 which are pivoted to opposite sides of the axle member 25 by a pivot bolt or other suitable fastening means 32, this pivot being located at the center of curvature of the arcuate blade 26. The lever arms 31 are provided at their lower edges with laterally directed seat forming shoulders 33 in vertical alinement with the seat forming shoulders 28 of the axle member 25 and a cushioning disk 34, of rubber or other suitable material, is interposed between the seats 28 and 33. Helical springs 35 are carried by the seats 33, one at either side of the axle, and cap washers 36 are positioned upon the upper ends of these springs. Bolts 37 are passed through these washers, longitudinally of the springs, through the seats 33, cushioning disks 34 and seats 28 and secured by nuts 38. As will be readily seen, the tension of the helical springs 35, and consequently the resistance which they will offer to movement of the yokes 30 with respect to the main axle member 25, may be varied at will by proper adjustment of the nuts 38. The operation of this form of axle is identical with that of the form earlier described and no further explanation is therefore deemed necessary.

In the form of my invention illustrated in Figs. 7 to 9 inclusive, the central or main axle member 39 is T-shaped in section, as shown in Fig. 9 of the drawings, and provided at its free ends with the arcuate blades or heads 40 and adjacent these blades and at its upper edges with the spring receiving seats 41 and the seats 42 adapted to receive the elliptic springs. The steering knuckles 43 are bifurcated to receive the blades 40 and are provided at their lower edges with the cushioned spring receiving seats 44 in vertical alinement with the seats 41. In this form of my invention, however, the steering knuckles are formed integrally with each other or connected by a supplemental axle section 45 which, as best shown in Fig. 1 of the drawings, is curved longitudinally to conform to the curvature of the main axle section 39 and which, as best shown in Fig. 9, is U-shaped transversely to receive between its sides the main axle section 39. This connecting member or axle section is of course slotted for the passage of the blades 40 to permit free movement of the axle sections 39 and 45 with respect to each other. The engagement of the T-shaped axle member 39 between the sides of the U-shaped axle member 45 tends to prevent any unusual tilting movement of the steering wheels with respect to the main axle section with the possibility of resultant injury to the ties. Helical springs 47 are interposed between the seats 41 and 42 in the same manner as the springs 24 in the form of my invention first described, to provide cushions for the axle. In this case, however, retaining bolts 48 are passed centrally through the seats 41 and 44 and are provided at their lower ends with nuts 49. Cushioning disks 50, of rubber or other suitable material, are carried by these bolts immediately below the lower seats 44, serving to cushion the return movement of steering knuckle section with respect to the main axle section.

From the foregoing description, taken in connection with the various figures of the drawings, it will be clear that I have provided a cushioned forward axle construction which is simple, economical and durable. It will further be clear that this axle may be constructed in a number of different ways and I do not therefore wish to limit myself to any specific details, as various changes, within the scope of the appended claims, may be made at any time without in the slightest degree departing from the spirit of my invention.

Having thus described the invention, what is claimed as new is:

1. A shock absorber including a main axle section adapted for attachment to a vehicle body, a knuckle carrying section co-acting with the first section, the main axle section being T-shaped in section to engage in the intermediate portion of the knuckle carrying section which is U-shaped in section, and cushioning means between the sections.

2. A shock absorber including a main axle section terminating at its ends in vertically disposed heads, said section adjacent the heads having laterally disposed seats, a steering knuckle section having vertical movement with respect to the main axle section and terminating at its ends in bifurcated steering knuckles adapted to receive the heads, and means for yieldably coupling such sections together.

3. A shock absorber including a main axle section terminating at its ends in vertically disposed heads, a steering knuckle section having vertical movement with respect to the main axle section and terminating at its ends in bifurcated steering knuckles adapted to receive the heads, and means for yieldably coupling such sections together, said means including vertically alined seats formed upon the sections, springs interposed between the seats of one section and those of the other, and fastening devices passed through the alined seats and springs.

4. A shock absorber including a main axle member terminating at its ends in vertically disposed arcuate heads and provided adjacent such heads with laterally disposed seats, steering knuckle receiving yokes bifurcated to receive the heads, an axle member connecting the yokes and movably connected to the main axle member, said yoke connecting axle member being formed with laterally disposed seats, and helical cushioning springs interposed between the seats of the main axle member and the other axle member.

5. A shock absorber including a main axle member terminating at its ends in vertically disposed arcuate heads and provided adjacent such heads with laterally disposed seats, steering knuckle receiving yokes bifurcated to receive the heads, an axle member connecting the yokes and movably connected to the main axle member, said yoke connecting axle member being formed with laterally disposed seats, helical cushioning springs interposed between the seats of the main axle member and the other axle member, and additional cushioning means adapted to operate upon expansion of such springs.

6. A shock absorber including a main axle member terminating at its ends in vertically disposed heads, said axle member adjacent the heads having laterally disposed seats, steering knuckle receiving yokes bifurcated to receive the heads, an axle member connecting the yokes and movably connected to the main axle member, laterally directed seats carried by said yoke connecting axle member in vertical alinement with the seats of the main axle member, cushioning members disposed below the seats of the yoke connecting axle member, helical compression springs positioned between the seats of the axle members, bolts passed through the springs, seats and cushioning members, and nuts adjustably mounted on the bolts.

7. A shock absorber including a main axle section adapted for attachment to a vehicle and formed at one end with a vertically disposed head, a second axle member formed at one end with a bifurcated knuckle yoke to receive the head, and cushioning means interposed between the axle members.

In testimony whereof I affix my signature in presence of two witnesses.

AUBURN BAILEY. [L. S.]

Witnesses:
 M. I. PERRY,
 FRANK CRITCHETT.

Copies of this patent may be obtained for five cents each, by addressing the "Commissioner of Patents, Washington, D. C."